United States Patent
Keswani (10) Patent No.: US 9,836,722 B2
(45) Date of Patent: Dec. 5, 2017

(54) MAIL MONETIZATION—REVENUE SHARING MODEL

(75) Inventor: Girish Keswani, Sunnyvale, CA (US)

(73) Assignee: EXCALIBUR IP, LLC, New York, NY (US)

( * ) Notice: Subject to any disclaimer, the term of this patent is extended or adjusted under 35 U.S.C. 154(b) by 2283 days.

(21) Appl. No.: 11/861,000

(22) Filed: Sep. 25, 2007

(65) Prior Publication Data

US 2009/0083142 A1    Mar. 26, 2009

(51) Int. Cl.
| | |
|---|---|
| G06Q 30/00 | (2012.01) |
| G06F 15/16 | (2006.01) |
| G06Q 10/10 | (2012.01) |
| G06Q 20/10 | (2012.01) |
| G06Q 30/02 | (2012.01) |

(52) U.S. Cl.
CPC .......... G06Q 10/107 (2013.01); G06Q 20/10 (2013.01); G06Q 20/102 (2013.01); G06Q 30/02 (2013.01); G06Q 30/0236 (2013.01)

(58) Field of Classification Search
CPC ....... G06Q 30/02; G06Q 10/107; H04L 29/08
USPC ...... 705/14, 1–10, 14.53, 14.71; 707/20–40; 709/1–30, 203, 206
See application file for complete search history.

(56) References Cited

U.S. PATENT DOCUMENTS

| 6,516,341 | B2 * | 2/2003 | Shaw et al. .................. 709/206 |
| 2001/0047294 | A1 * | 11/2001 | Rothschild .................... 705/14 |
| 2002/0087631 | A1 * | 7/2002 | Sharma ........................ 709/203 |
| 2005/0004837 | A1 * | 1/2005 | Sweeney et al. .............. 705/14 |
| 2005/0010641 | A1 * | 1/2005 | Staack .......................... 709/206 |
| 2006/0129451 | A1 * | 6/2006 | Kohanim et al. .............. 705/14 |
| 2007/0022167 | A1 * | 1/2007 | Citron .......................... 709/206 |

* cited by examiner

Primary Examiner — Sun Li
(74) Attorney, Agent, or Firm — James J. DeCarlo; Greenberg Traurig, LLP (57) ABSTRACT

This disclosure describes systems and methods for including advertisements in outgoing electronic messages and rewarding the sender for every recipient who clicks on an included advertisement. The disclosure further describes various methods for selecting keywords used to generate the advertisement as well as a method for allowing the sender to directly select the advertisement from an advertisement listing. Furthermore, the disclosure discusses various forms of rewarding the sender including a revenue sharing method.

18 Claims, 10 Drawing Sheets

MAIL MONETIZATION—REVENUE SHARING MODEL

BACKGROUND

Many online service providers, such as search engines, news and content providers, and application service providers, utilize a business model in which services are given away to Internet users for free. The services are paid for by advertising revenue provided by advertisers who pay the service provider to display advertisements to its users. The service providers, then, prefer to display as many advertisements to their users as possible without interfering with the user's access to the service provided.

SUMMARY

This disclosure describes systems and methods for including advertisements in outgoing electronic messages and rewarding the sender for every recipient who clicks on an included advertisement. The disclosure further describes various methods for selecting keywords used to generate the advertisement as well as a method for allowing the sender to directly select the advertisement from an advertisement listing. Furthermore, the disclosure discusses various forms of rewarding the sender including a revenue sharing method.

One aspect of the disclosure is a method that includes receipt of a transmission request from a sender. The transmission request identifies a text message and one or more recipients of the text message. An electronic message containing the text message and an advertisement is generated and transmitted to at least one recipient. If the recipient selects the advertisement included in the electronic message, then a notification is received. As a result, the sender is rewarded.

Another aspect of the disclosure is a method that includes receipt of a transmission request from a sender. The transmission request identifies a text message and one or more recipients of the text message. An electronic message containing the text message and an advertisement is generated and transmitted to at least one recipient.

The disclosure further describes a system comprising an electronic message system for receiving a transmission request from a sender. The transmission request may identify a text message and one or more recipients of the text message, and may generate an electronic message containing the text message and an advertisement selected by the sender.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure and functions particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

This disclosure describes systems and methods for including advertisements in outgoing electronic messages and rewarding the sender for every recipient who clicks on an included advertisement. The disclosure further describes various methods for selecting keywords used to generate the advertisement as well as a method for allowing the sender to directly select the advertisement from an advertisement listing. Furthermore, the disclosure discusses various forms of rewarding the sender including a revenue sharing method.

For the purposes of this disclosure, the sender and recipient generally exist on separate computing devices, although it is conceivable that they could be separate users on a shared computing device with separate email addresses, and both the sender and recipient computing devices are typically separate from the electronic message system, although it is conceivable that the message system could reside in whole or in part on a sender or recipient device or both. The electronic message system comprises elements used to transfer electronic message communications between a sender and a recipient. For instance, the electronic message system may comprise a mail transfer agent, internet service provider, mail exchange servers, and/or domain name service servers among other elements.

The following definitions of an electronic message, a computer-readable medium, an advertisement engine, a server, a computing device, a client machine, and a mail server will clarify the detailed description that follows the definitions. For the purposes of this disclosure, an electronic message includes but is not limited to an e-mail, a cell phone call, a text-message via cell phone, an instant message, or any combination of the aforementioned communication mediums, and any data that is transmitted along with one of the aforementioned communication mediums.

For the purposes of this disclosure, computer-readable media include volatile and non-volatile, removable and non-removable media implemented in any method or technology for storage of information such as computer-readable instructions, data structures, program modules or other data. Computer-readable media includes, but is not limited to the following: RAM, ROM, EPROM, EEPROM, flash memory or other solid state memory technology; CD-ROM, DVD, or other optical storage; magnetic cassettes, magnetic tape, magnetic disk storage or other magnetic storage devices; or any other medium which can be used to store the desired information and which can be accessed by a computing device.

For the purposes of this disclosure, an advertisement engine or ad engine describes a software, hardware, or firmware (or combinations thereof) system, process or functionality that performs or facilitates the processes, features, and/or functions described herein (with or without human interaction or augmentation).

A server is software or hardware capable of performing services for a client and may store data. A server may be a single server or a group of servers acting together. A number of program modules and data files may be stored in a mass storage device and/or RAM of the server They may include an operating system suitable for controlling the operation of a networked server computer, such as the WINDOWS XP or WINDOWS 2003 operating systems from MICROSOFT CORPORATION.

For the purposes of this disclosure a computing device includes a processor and memory for storing and executing program code, data and software. Computing devices may be provided with operating systems that allow the execution of software applications in order to manipulate data. Personal computers, PDAs, wireless devices, cell phones, internet appliances, media players, home theater systems, and media centers are several non-limiting examples of computing devices.

For the purposes of this disclosure, a client machine is a computing device capable of issuing electronic message transmission requests, and responding to promptings from the electronic message system (for instance responding to a prompting to include advertisements in transmitted electronic messages).

A mail server is software or hardware capable of performing services for a client and may store data. A server may be a single server or a group of servers acting together. A number of program modules and data files may be stored in a mass storage device and RAM of the server, including an operating system suitable for controlling the operation of a networked server computer, such as the WINDOWS XP or WINDOWS 2003 operating systems from MICROSOFT CORPORATION.

Figure 1:
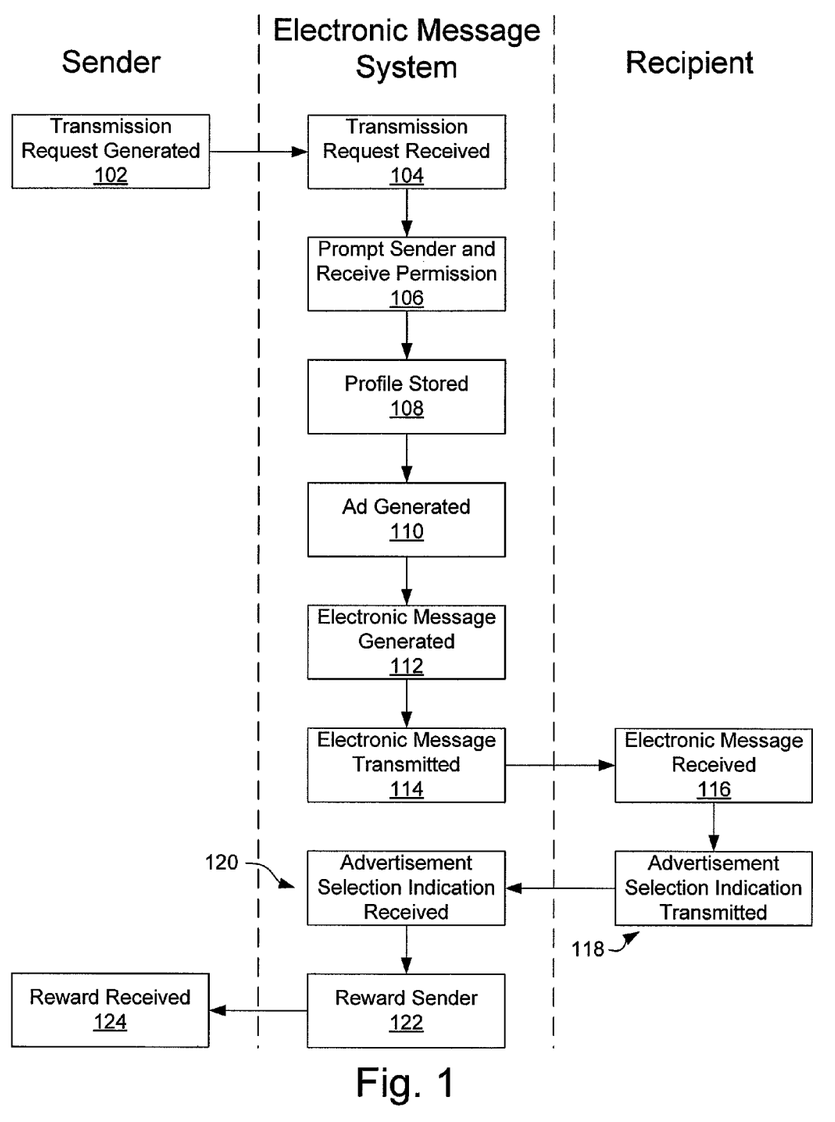
FIG. 1 illustrates an embodiment of a method for generating a sender's outgoing electronic message, including at least one advertisement, and rewarding the sender if a recipient selects the at least one advertisement.

FIG. 1 illustrates an embodiment of a method for generating a sender's outgoing electronic message, including at least one advertisement, and rewarding the sender if a recipient selects the at least one advertisement. For the purposes of this disclosure, the advertisement is transmitted with an electronic message and displayed on a recipient's display along with the electronic message. For instance, the advertisement may appear as text, below an electronic message's text, describing a product along with a link to the web page where the product may be purchased. At the same time, the advertisement may be displayed as a picture at the end of an electronic message or as a pop-up ad that appears when an electronic message is opened by a recipient. The advertisement may also be displayed as web page links along with descriptions of a product and pricing that appear adjacent to the text of the electronic message. For instance, a product title, description, price, and hyperlink to the webpage where the product may be purchased may appear below the final line of text in an electronic message. The advertisement may be appended to an electronic message so that the advertisement and electronic message comprise a single file, or the advertisement may be appended to an electronic message creating two separate, yet associated files.

The method illustrated in FIG. 1 includes a generate transmission request operation 102, in which the sender generates a transmission request for an outgoing electronic message. This action may take the form of a sender selecting the "SEND" button either in the sender's electronic message software application or on a physical electronic message capable device such as a PDA or cell phone. It may also be generated by a server associated with the sender in response to a similar action. The transmission request operation 102 may also include the caching of the electronic message on a local storage device or a remote storage device, where a storage device may be a computer readable medium. The method includes a receive transmission request operation 104 wherein the electronic message system receives the transmission request from the sender. The method may include a prompt sender and receive permission operation 106. Details of this operation are discussed with reference to FIG. 2.

Figure 2:
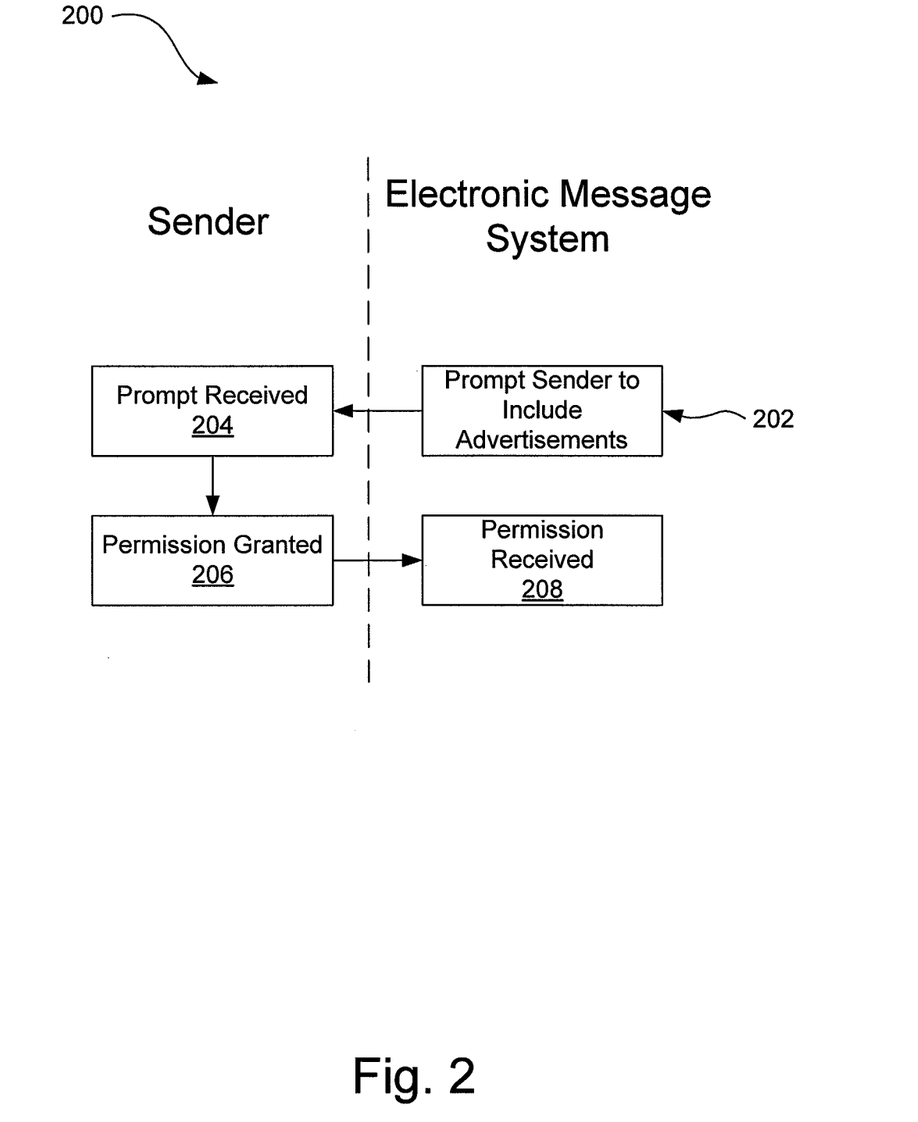
FIG. 2 is an embodiment of a prompt the sender to include advertisements and receive permission to include advertisements operation.

FIG. 2 illustrates an embodiment of a method for performing the prompt operation 106 described with reference to FIG. 1. In this embodiment the electronic message system prompts the sender to include advertisements in a prompt sender to include advertisements operation 202, and the prompting is received by the sender in a prompt received operation 204. In one embodiment, a selection object may be displayed after the prompt is received. The selection object may be rendered in the sender's user interface, and selection of the selection object indicates to the electronic message system that the user has given permission for the advertisement to be included in the outgoing electronic message. The selection object may comprise a check box, a button, or any other graphical object that a sender may select.

Alternatively, a window may be displayed with a text-displayed question asking the sender if the advertisement may be included in the outgoing electronic message, and the window may include one or more selection objects capable of initiating a process wherein advertisements are included in an electronic message. For example, a checkbox could indicate whether or not advertisements are to be included in an outgoing electronic message. Or, a sender using an electronic communication application, such as MICROSOFT OUTLOOK, may press the "SEND" button resulting in the text, "Do you wish to include advertisements?" being displayed to the sender. Below the text there may be a button labeled "YES" and a button labeled "NO." Selecting the "YES" button instructs the electronic message system to include advertisements in the outgoing electronic message, and selecting "NO" instructs the electronic message system to transmit the electronic message as is. In another embodiment, a selection tool may be provided allowing the sender to select which persons on a list of possible recipients are to receive electronic messages with advertisements. For example, a sender's contact list may include checkboxes next to each contact, or there may be a selection object within the properties of each contact, that instructs the electronic message system to include advertisements in outgoing electronic messages to the selected contacts. The sender can therefore pre-define which recipients will receive advertisements.

In another embodiment, two transmission request buttons exist in the sender user interface. One transmission request button requests a transmission, while the second button requests a transmission that includes advertisements. For instance, the transmission request buttons may read, "SEND," and "SEND WITH ADVERTISEMENTS." Thus, the sender need not be prompted regarding advertisements since the decision will be made at the time the transmission request is made.

The method 200 also includes a receiving permission operation 206 wherein the sender grants permission for advertisements to be added to the sender's outgoing message. For example, and continuing to use the MICROSOFT OUTLOOK example, the user may select the "YES" button, granting permission to include advertisements in the outgoing electronic message. The permission is received by the electronic message system in a permission received operation 208.

Alternatively, instead of including a prompt sender and receive permission operation 206, the method 200 may have a long-term selection option that allows a sender to opt-in to the advertisement inclusion system. As such, the sender would select an option indicating that the sender wishes advertisements to be included in all outgoing electronic messages. In another embodiment, such an option could include further options allowing certain recipients to be excluded from receiving advertisements in electronic messages addressed to them. Also, once the sender has opted-in to such a program, a user interface that the sender uses to draft and transmit electronic messages may include an option to exclude just the recipient of a given electronic message from receiving an advertisement.

Referring back to FIG. 1, the method may also include a profile stored operation 108. Storing information regarding the selection may enable the electronic message system to predict sender selection for subsequent electronic message transmission requests and potentially avoid the need to prompt the sender before subsequent requests. For instance, and again using the MICROSOFT OUTLOOK example, a window may be displayed asking, via a text message, whether the sender wishes to include advertisements in the outgoing electronic message. Selection buttons may include "YES," "NO," and "ALWAYS." The first two buttons may operate as previously described. If the sender selects the "ALWAYS" button, then the electronic message system can note this selection and store the information in the sender's profile. All future electronic messages may then include advertisements without prompting the sender. Alternatively, a button labeled "ALWAYS TO THIS RECIPIENT" may be available, indicating that the recipient(s) of the outgoing electronic message will automatically receive advertisements in future electronic messages.

In another embodiment, the electronic message system maintains a record of the selections made by the sender with reference to different recipients. If the sender selects the selection object with reference to the same recipient on multiple transmission requests, then the electronic message system may ask the sender if advertisements should always be included. The sender's response may be stored and used in future electronic message transmissions. Alternatively, if the sender selects the selection object at greater than a pre-determined frequency, then the electronic message system may ask the sender if advertisements should be included with all outgoing messages regardless of the recipient. The response may be stored and used in future electronic message transmissions.

The method also includes an ad generation operation 110 in which an advertisement is generated for the message. The ad generation operation 110 will be explained during discussion of FIG. 3.

The method also includes an electronic message generated operation 112. Having received a transmission request from the sender, the electronic message system can, at any point thereafter, generate an electronic message in preparation for transmittal to the recipient. This may include preparing the sender's electronic message to be transmitted and including in the electronic message one or more advertisements. For instance, if an advertisement is a picture file, such as a .jpg, then the generate electronic message operation 112 may add the .jpg file to the electronic message. Thus, when the message is opened, the electronic message system displays the text of the electronic message as well as the picture.

More than one advertisement may be added to electronic messages in this manner and the position or timing of displaying the one or more advertisements may vary. For instance, a first advertisement may appear at the bottom of a received electronic message, and after ten seconds the first advertisement may be replaced with a second advertisement. Or two or more advertisements may be simultaneously displayed in the recipient's GUI.

Once the electronic message has been generated, it is transmitted to the recipient in an electronic message transmittal operation 114. The recipient may receive the electronic message with advertisements in an electronic message received operation 116. Once received, the recipient may select the one or more advertisements, and upon doing so an indication may be transmitted to the electronic message system in an advertisement selection indication transmittal operation 118. The indication may be received in an advertisement selection indication received operation 120. If such an indication is received by the electronic message system, then the sender may be rewarded in a reward sender operation 122.

In one embodiment, rewarding the sender entails paying the sender a fixed amount of money. In another embodiment, payment may be based upon the revenue garnered by the advertiser or the owner of the electronic message system. For instance, an advertiser may determine that he/she garners $10 in revenue for every one hundred recipients that select an advertisement directing the recipients' web browsers to the advertiser's web page. The advertiser may therefore offer the sender $0.01 for every recipient that selects an advertisement included in electronic messages. This revenue sharing embodiment may entail a linearly-proportional relationship between advertiser revenue and sender reward, or may entail a nonlinearly-proportional relationship. For instance, for the first $1000 in revenue that an advertiser garners from recipients being directed to the advertiser's website, the sender may receive $0.01 for every recipient that selects an advertisement, but for $1001-$5000 in revenue that an advertiser garners from recipients being directed to the advertiser's website, the sender may receive $0.02 for every recipient that selects an advertisement. Various other revenue sharing embodiments are also possible.

Yet another embodiment defines rewarding the sender as giving the sender a gift certificate or credit with the advertiser. Another embodiment entails rewarding the sender by bestowing names upon the sender where names may include titles. For instance, the electronic message system may track the number of recipients who click on advertisements from a sender. When this number reaches certain pre-determined levels, the electronic message system may thereafter include the title "Marketing Phenon" in the sender's return address on outgoing electronic messages. Alternatively, bestowing names may include displaying the name in text on webpages that the sender visits. Rewarding may also include granting a sender access to special services, such as increased electronic message file size on a server, the use of logos in outgoing electronic messages that are not available to other electronic message senders, or access to enhanced applications such as a mapping program (e.g. GOOGLEMAPS or MAPQUEST) with enhanced satellite imagery, or an MP3-specific search engine. In another embodiment the owner of the electronic message system may reward the sender by offering discounted services.

Figure 3:
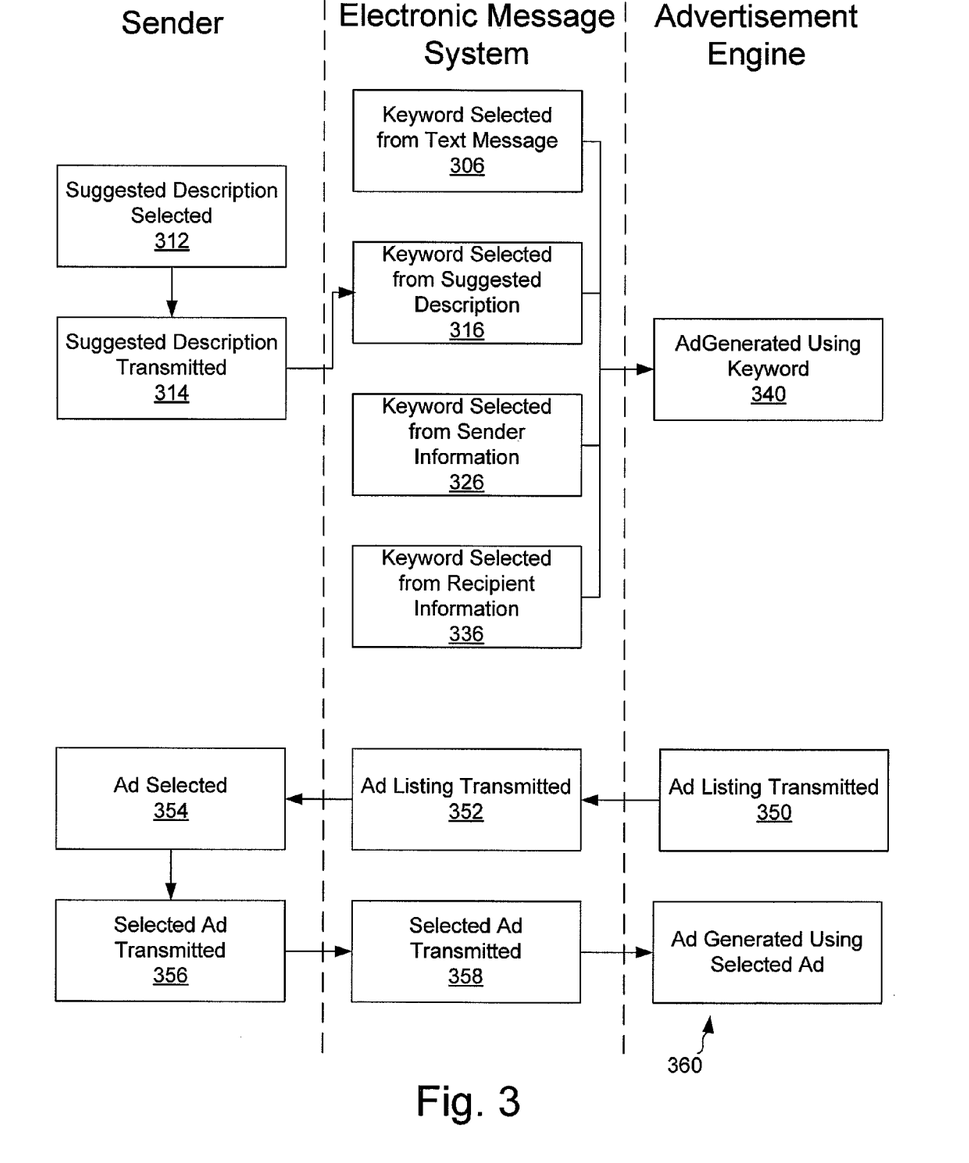
FIG. 3 illustrates an embodiment in which the ad generated operation is performed by an electronic message system and an advertisement engine.

FIG. 3 illustrates an embodiment of a method for generating an ad to be used with an electronic message. In the embodiment shown, an ad is generated by selecting one or more keywords and providing them to the advertisement engine. The embodiment illustrates four different alternatives for selecting a keyword: selecting based on a suggested description (operations 312, 314, 316), selecting based on text in the message (operation 306), selecting based on information associated with the sender (operation 326) and selecting based on information associated with the recipient (operation 336). Each will be discussed in turn below. In addition, FIG. 3 also illustrates an embodiment of a method (operations 350, 352, 354, 356, 358, 360) in which the ad is selected directly by the sender instead of being selected via a keyword.

In the keyword embodiments, the electronic message system identifies a keyword or keywords that may or may not describe the content of the electronic message and provides this keyword to the advertisement engine, and the advertisement engine then uses this keyword to generate an advertisement. A keyword is a word, multiple words, a phrase, or a sentence that may be used to generate an advertisement.

The electronic message system and advertisement engine may execute on a local computing device, a client, or may execute on a remote computing device, a server. In one embodiment, the electronic message system executes on a first server while the advertisement engine executes on a second server.

In an embodiment, the electronic message system may select the keyword from the electronic message in a keyword selected from text message operation 306. For example, an electronic message containing commentary on the latest model FORD pickup truck's suitability for drawing a horse trailer could be searched and the determined keyword is likely composed of words such as "FORD", "automobile", "pickup truck", "horse", and "trailer".

The keyword may be selected based on the number of times a given word occurs. For instance, the three most common words appearing in an electronic message may be selected as the keyword. Alternatively, the keyword may be selected based on a given word's location in the electronic message. For instance, if the electronic message is an e-mail, then the electronic message system may look for elements of the keyword in the subject heading as well as the body of the electronic message, and weight words found in the subject heading more heavily than those found in the body. In yet another embodiment, the electronic message system may search the electronic message for phrases that match a database of frequently-used phrases. Other methods of selecting the keyword may also be used.

In another embodiment, the keyword may be determined by requesting and receiving a suggested description from the sender. In this embodiment, a sender selects a suggested description from a set of descriptions in a selection operation 312. The selected description is transmitted to mail server in a transmission operation 314. From this description, one or more keywords are then selected by the mail server and transmitted to the advertisement engine in a keyword selection operation 316. In another embodiment, the sender may be prompted to enter a suggested description. Prompting may be embodied in the operation of displaying a text-entry object, visually similar to text-entry objects that appear when logging in to secure internet webpages. Once a suggested description is entered, it may be used to generate a keyword.

In the suggested description embodiment, the text-entry object may appear when a keyword cannot be determined from the electronic message. For example, if an electronic message only contains the phrase, "What's up Fred?" the electronic message system may be unable to identify a useful keyword. As a result, a suggested description textbox may be displayed in the user interface, thus allowing the user to enter a suggested description. The electronic message system may prevent the electronic message from being sent until the sender has entered text into the suggested description textbox.

Keywords may also be selected from information known about the sender 326, such as a database of sender information, the sender's profile, through a sender identifier associated with the electronic message, a cookie, or some other means. Information from a sender database may include the sender's demographic information, past purchase history, and user interests. The sender database may be located on or accessible via the remote server associated with the electronic message application. Alternatively, the keyword may be selected from the sender database directly. For instance, the electronic message system may find a keyword identifying the sender's income level, a recent retailer through which the sender made purchases, or the sender's location. Thus, in addition to "FORD", "automobile", "pickup truck", "horse", and "trailer", the electronic message system may also generate the keywords "wealthy", "SAKS FIFTH AVENUE" and "Kentucky". Similarly, keywords may also be selected from information known about the recipient in a keyword selected from recipient information operation 336.

The keyword generated by the electronic message system may be used by the advertisement engine to generate an advertisement in an advertisement generated using keyword operation 340. In an embodiment of this operation, an advertisement listing, stored on an advertisement database, is associated with keywords, such that a simple keyword matching algorithm can be used to select an advertisement. For example, and continuing the example provided above, in response to the keyword comprising "FORD", "automobile", "pickup truck", "horse", "trailer", "wealthy", "SAKS FIFTH AVENUE" and "Kentucky", the advertisement engine may select an advertisement for a luxury equestrian clothing line based on the "horse" and "wealthy" elements. At the same time, the advertisement engine may select an advertisement for SAKS FIFTH AVENUE or a competitor based on the elements "wealthy" and "SAKS FIFTH AVENUE". Alternatively, a more complex analysis can be used to determine which of the advertisements in the advertisement listing should be selected based on the keyword provided as well as other known criteria such as user occupation, interests, and income. Along these lines, one embodiment envisions an advertisement being selected from a combination of the keyword and the sender or recipient profile.

In another embodiment the advertisement engine provides an advertisement listing to the electronic message system, which provides the listing to the sender. The listing is displayed on the sender's user interface. The sender may select an advertisement (referred to as an ad in the figures) from the listing. The selected advertisement may then be used as the advertisement included in electronic messages. This sequence of operations may include an advertisement listing transmittal to the electronic message system operation 350 as well as an advertisement listing transmittal to sender operation 352. The listing may then be displayed on the sender's user interface as text, pictures, hyperlinks, video, slide shows, text combined with pictures, or other representations of the advertisement. Members of the listing may be selected in an advertisement selection operation 354, and a selected advertisement transmittal operation 356 transmits the selection information to the electronic message system. The electronic message system may then transmit the listing to the advertisement engine in a selected ad transmitted operation 358. The ad engine may then use the selected advertisement to generate an advertisement in an advertisement generated using selected advertisement operation 360. Since the transmitted information may only be a link to the stored advertisement, the generate operation 360 may entail the advertisement engine retrieving the advertisement. Alternatively, the advertisement may be tailored to the recipient such that elements may be mixed to generate a single advertisement. For instance, a video of a sports car may be overlaid with text reading, "Johnny will be thronged by women if he buys this car," where the word "Johnny" was selected from the recipient's name in the electronic message.

Many other combinations and embodiments of generating advertisements are also possible. For instance, the electronic message system may search for a keyword, and if one cannot be identified, then the electronic message system may prompt the user for a suggested description. Alternatively, the electronic message system may search for a keyword, and if one cannot be identified, then the electronic message system may provide an advertisement listing to the sender, where the advertisement listing may be provided by the advertisement engine. Or, the electronic message system may search for a keyword, and if one cannot be identified, then the electronic message system may prompt the user for a suggested description. If a suggested description is not provided, then the electronic message system may provide an advertisement listing to the sender.

Figure 4:
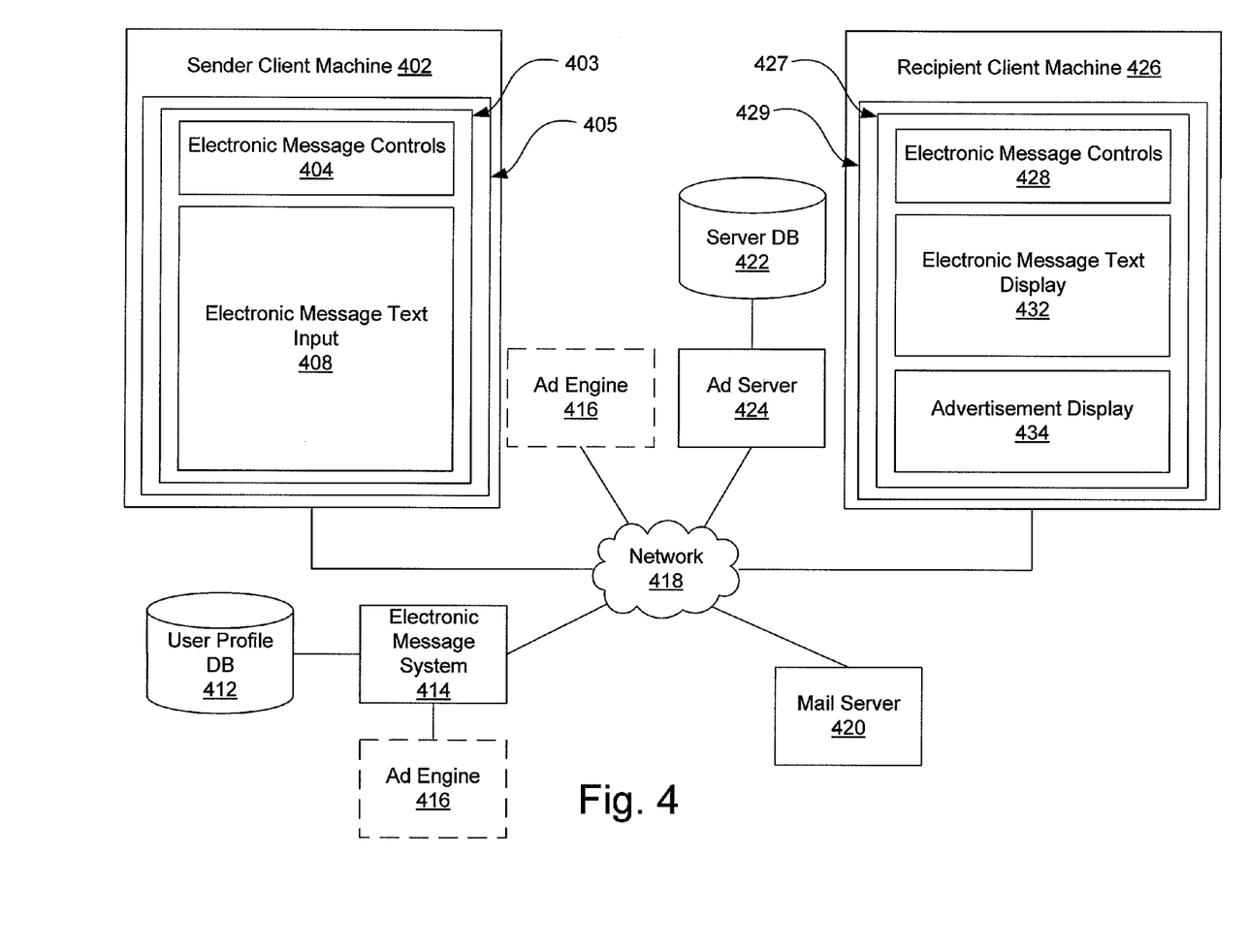
FIG. 4 illustrates an embodiment of a system capable of carrying out the methods disclosed.

FIG. 4 illustrates an embodiment of a system capable of carrying out the methods disclosed. The system 400 enables a sender to transmit an electronic message to a recipient, via a network, wherein the electronic message may include advertisements. A sender's client machine 402 issues a request for transmission of an electronic message to an electronic message system 414 and/or a mail server 420 through a network 418. If the sender has not already given permission for advertisements to be included in the electronic message, then the electronic message system 414 may prompt the senders client machine 402 to include advertisements. Once permission is received, the electronic message system 414 may store information describing the sender's permission in a user profile database 412.

The electronic message system 414 identifies a keyword in one of the ways described with reference to FIG. 3. An advertisement server, or ad server 424, may then generate the advertisement based on the keyword. An advertisement server is a server that provides access to a server database 422 of advertisements and advertisement data. The access is made available to client machines 402, 426, the electronic message system 414, the advertisement engine 416, and the mail server 420 as well as any other devices that may require access to the server database 422. Alternatively, an advertisement server 424 may provide a listing of advertisements to the electronic message system 414, which in turn provides the listing to the sender's client machine 402. Once the sender selects an ad from the listing, the ad may be generated by an ad engine 416. The ad engine 416 may communicate with the sender client machine 402 through the network 418 or may communicate with other elements of the system 400 through the electronic message system 414.

The electronic message system 414 may transmit the electronic message to the mail server 420 where the message may be routed to the recipients client machine 402. Alternatively, the mail server 420 and electronic message system 414 may be incorporated into the same device or the same subsystem (not shown), such that the combined device or subsystem may transmit the electronic message to the recipients client machine 402.

The recipient client machine 426 may receive the electronic message and display the message on a user interface 427 provided on a display 429 on the recipient client machine 426. The recipient may select the advertisement, and information regarding this selection may be transmitted to the electronic message system 414. The electronic message system 414 may then reward the sender.

The sender client machine 402 may comprise a display 405 in which a user interface 403 is displayed. The user interface may include electronic message controls 404 such as textboxes for entering recipient addresses, carbon copy recipients, and a subject heading. The controls 404 may also include selection objects for sending the message, printing the message, and controlling the format of the text. The interface 403 may also include an electronic message text input 408 where the sender may enter the text of the electronic message.

As mentioned, the recipient client machine 426 may comprise a display 427 in which a user interface 429 is displayed. The user interface 429 may comprise message controls 428. The controls 428 may include selection objects such as those that allow a message to be sent back to the sender or to multiple senders. Selection objects may also allow the electronic message to be deleted or stored in various folders. Other controls are also envisioned as would normally be comprised in a user interface such as provided by MICROSOFT OUTLOOK. The user interface 428 may also include an electronic message text display 432 in which the text of the sender's electronic message is visible. The user interface 427 may also comprise an advertisement display 434, in which the advertisement may be displayed if the sender opted to have advertisements included in the electronic message.

Figure 5:
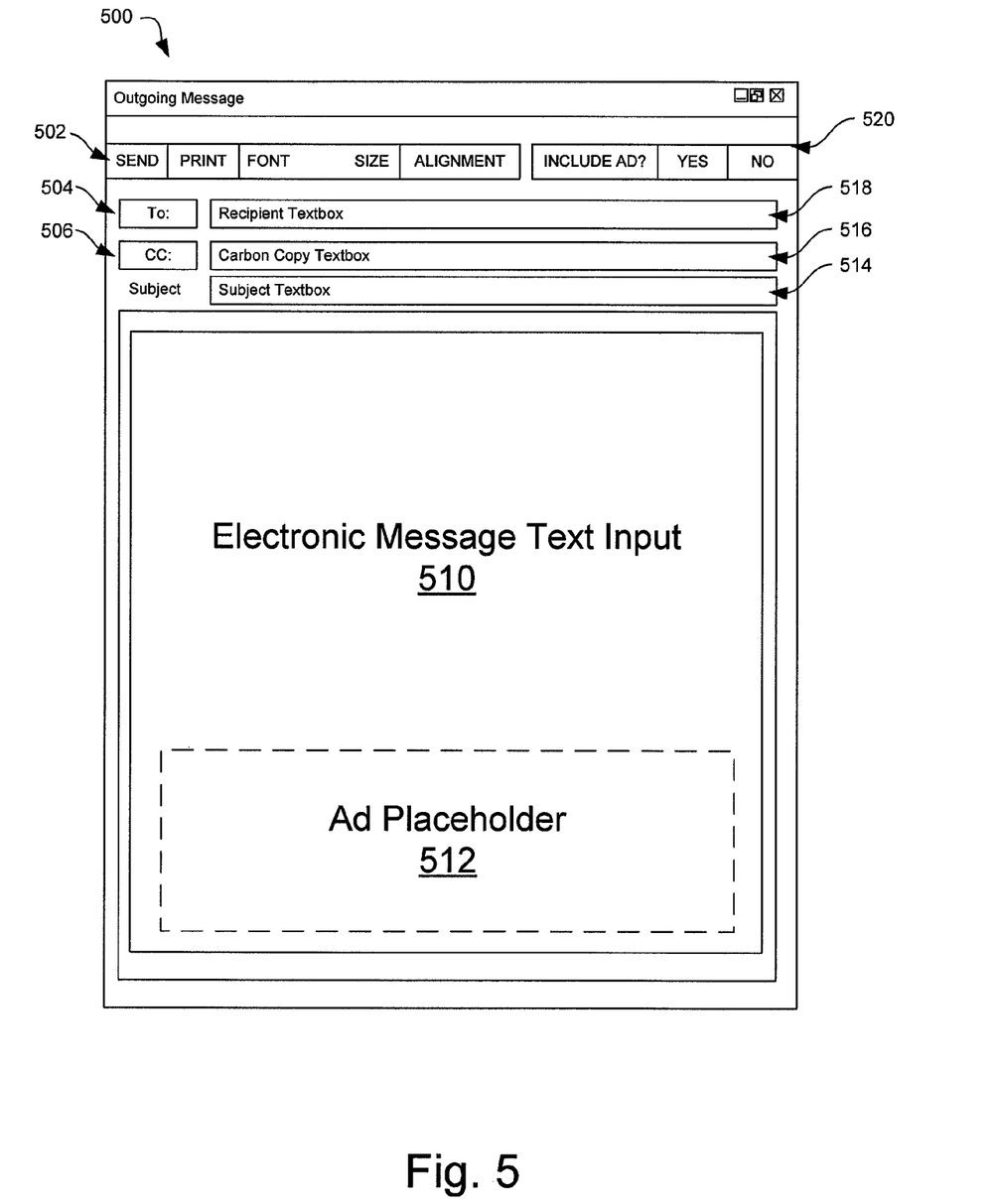
FIG. 5 illustrates an embodiment of a sender's user interface that may be displayed to the sender.

FIG. 5 illustrates an embodiment of a sender's user interface that may be displayed to the sender. In the illustrated embodiment, the user interface 500 is an interface for writing and transmitting an electronic message. The interface 500 may include buttons 502 for sending, printing, changing fonts and alignments, and other features that an electronic message writing and transmitting interface normally includes. The interface 500 may also include a button 504 for opening additional windows associated with the one or more recipients, and a recipient textbox 518 for entering electronic message addresses for recipients. The interface 500 may also include a button 506 for opening additional windows associated with a second type of recipient such as those that are "carbon copied." Electronic message addresses for recipients of a carbon copy may also be entered into a carbon copy textbox 516. The interface 500 may also include a subject textbox 514 for entering text describing the subject of the electronic message. The text of the electronic message may be entered in an electronic message text input 510.

In one embodiment, the interface 500 may include an advertisement placeholder or ad placeholder 512. The placeholder 512 indicates to the sender where an advertisement will be displayed when viewed by the recipient. This gives the sender a sense of what the electronic message will look like when viewed on the receiving end. Additionally, the placeholder 512 may be displayed such that it prevents the sender from entering text in the location to be occupied by the advertisement. The placeholder 512 is not restricted to the location illustrated. Rather, the placeholder 512 may be dynamically displayed, such that it always appears just below the bottom of the text that is entered by the sender. Other dynamic locations such as above the text or to the side of the text may also be used. The placeholder 512 may also be an optionally-displayed element that may only be displayed when the sender requests that the placeholder 512 be displayed. Such a request may be set in a preferences setting.

The interface 500 may also include one or more buttons for pre-selecting whether advertisements will be included in the electronic message, such buttons are herein referred to as an ad control object 520. In the illustrated embodiment, the ad control object 520 includes a "YES" button and a "NO" button associated with the text "INCLUDE AD?" Other types of buttons and combinations thereof are also possible. If the YES button is selected then an advertisement will be included with the electronic message. If the NO button is selected, then an advertisement will not be included with the electronic message. In an alternative embodiment, the ad control object may be a check box or other binary selection object that when selected indicates to the electronic message system that an advertisement is to be included with the electronic message. Other text as well as graphics may be displayed on the ad control object 520.

Figure 6:
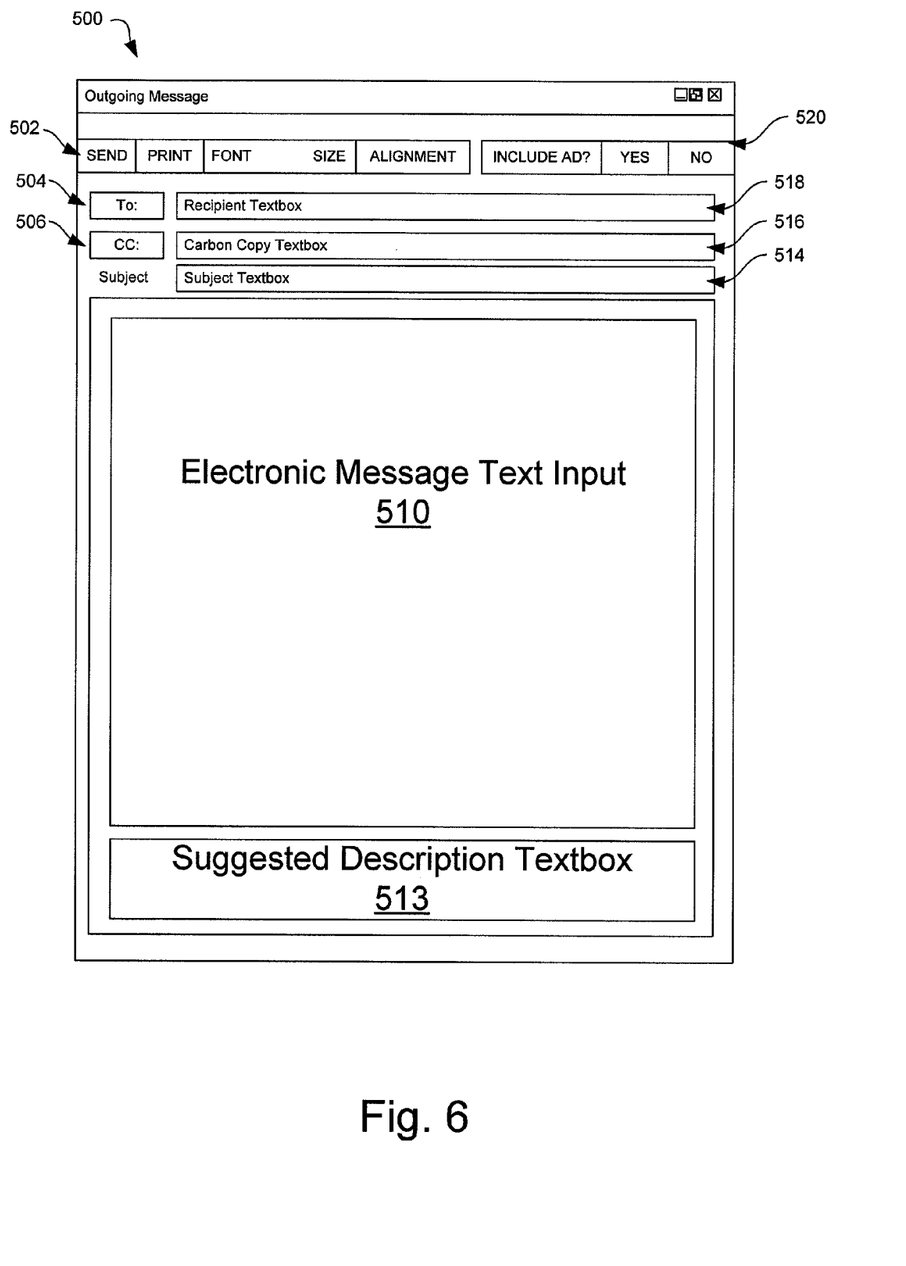
FIG. 6 illustrates an embodiment of the sender's user interface including a suggested description textbox.

FIG. 6 illustrates an embodiment of the sender's user interface including a suggested description textbox. As described previously, the sender may enter text into the suggested description textbox, and the suggested description may be used to derive the keyword. In an embodiment, the suggested description text-box may appear if the electronic message system is unable to identify a keyword from the text of the electronic message, but otherwise not be displayed.

Figure 7:
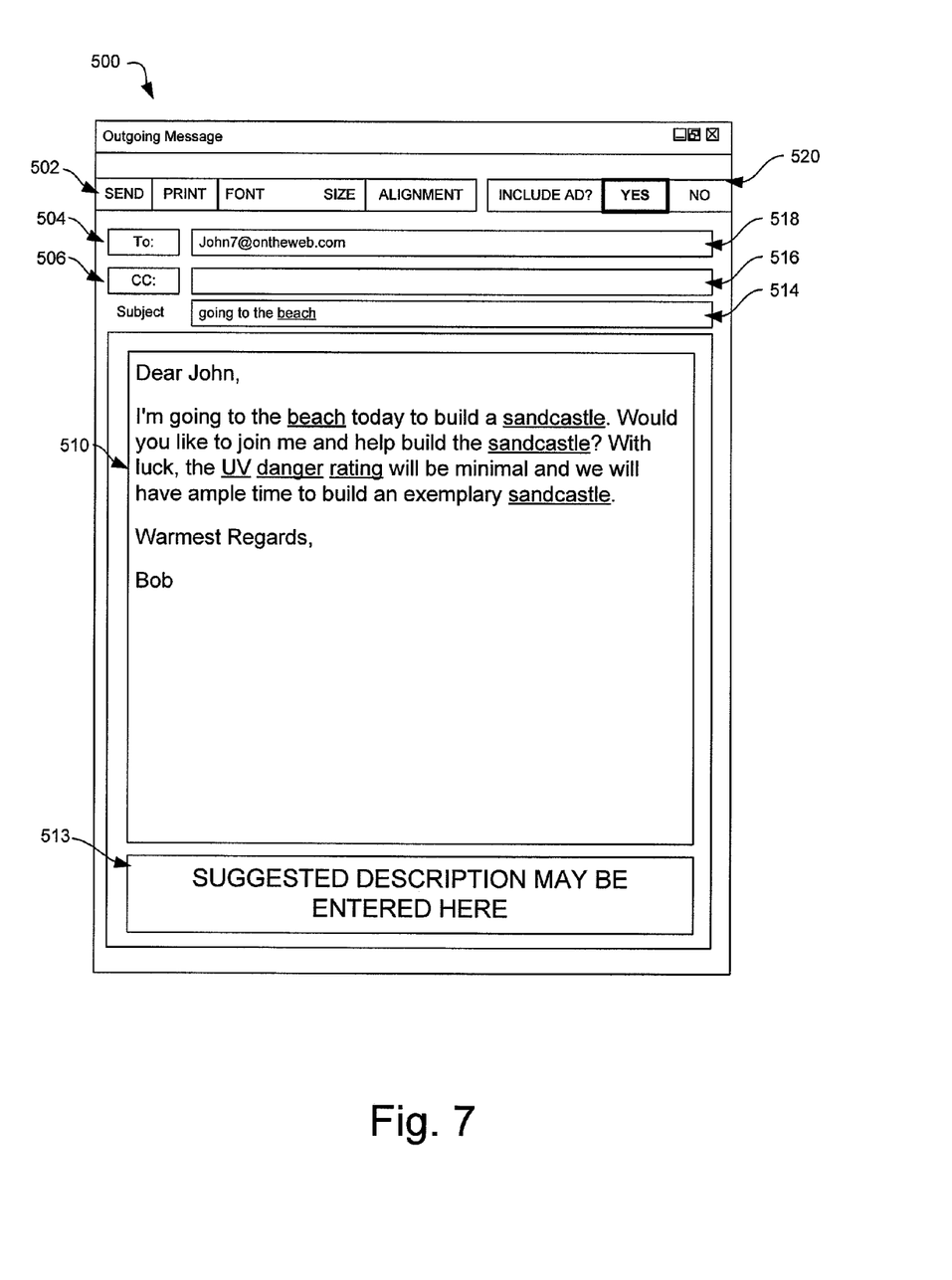
FIG. 7 illustrates an embodiment of the sender's user interface.

FIG. 7 illustrates an embodiment of the sender's user interface. In the user interface illustrated, a suggested description textbox 513 is provided through which the sender may insert a suggested description or keyword(s) for use in ad selection. Hence, the suggested description textbox 513 presents the text "SUGGESTED DESCRIPTION MAY BE ENTERED HERE" in order to inform the sender that text can be entered in textbox 513.

Also, words in the electronic message text have been underlined to illustrate a set of words that the electronic message system may select as the keyword in absence of a selection by the sender. In this illustration the keyword is "beach, sandcastle, UV, danger rating, UV danger rating, sandcastle." Other keywords could have been selected depending on the algorithm used. Also, the keyword may be refined by for instance as only including the word most frequently appearing in the electronic message. In such an embodiment, the keyword would be "sandcastle" because it appears three times. Other methods for refining the keyword may also be used. The illustrated user interface also includes a selection of the YES object of the ad control object 520. As seen, an embodiment may include visually highlighting the control object when the sender selects the object.

Figure 8:
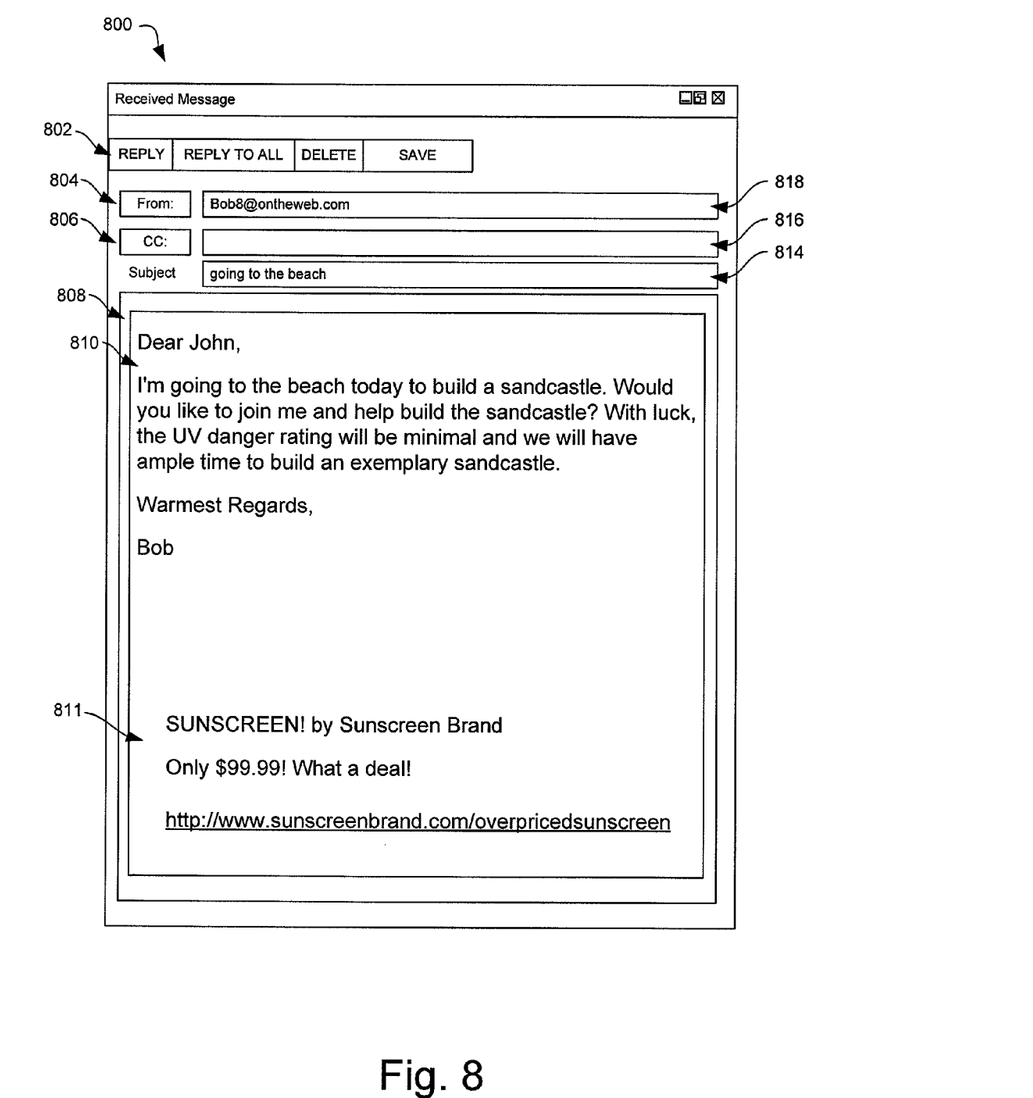
FIG. 8 illustrates an embodiment of a recipient's user interface.

FIG. 8 illustrates an embodiment of a recipient's user interface. The user interface 800 may include a set of selection objects 802 for controlling actions taken with regard to the received electronic message. Such controls may include controls for replying to the sender, replying to all senders, either deleting or saving the electronic message, as well as other controls. The interface 800 may also include a sender text display 518 indicating who the electronic message was sent from and/or may include an address associated with the sender or other identifying information such as an electronic message address. The interface 800 may also include a carbon-copy text display 516 indicating who received carbon copies of the electronic message. The interface 800 may also include a subject textbox 814 for displaying the subject of the electronic message. The electronic message text 810 may be displayed in the electronic message text display 808. An advertisement 811 may appear below the text 810 of the electronic message. In other embodiments, the advertisement 811 may appear in other locations relative to the electronic message text 810, such as above, to the sides, or interspersed with the text.

The advertisement 811 is an example of an advertisement that the ad engine may provide based on the keyword from FIG. 7 which was "sandcastle, UV, danger rating, UV danger rating, sandcastle." In this illustration of an advertisement, the advertisement includes a short description of a product along with a hyperlink to a web page where the product may be purchased or further researched by the recipient. A hyperlink is text that when selected causes a web browser to request a web page or file associated with the text. If a web browser is not open when a hyperlink is selected, then a web browser will be opened. Clicking on the hyperlink will initiate a transmission of information regarding the selection to the electronic message system. The electronic message system may subsequently reward the sender.

Figure 9:
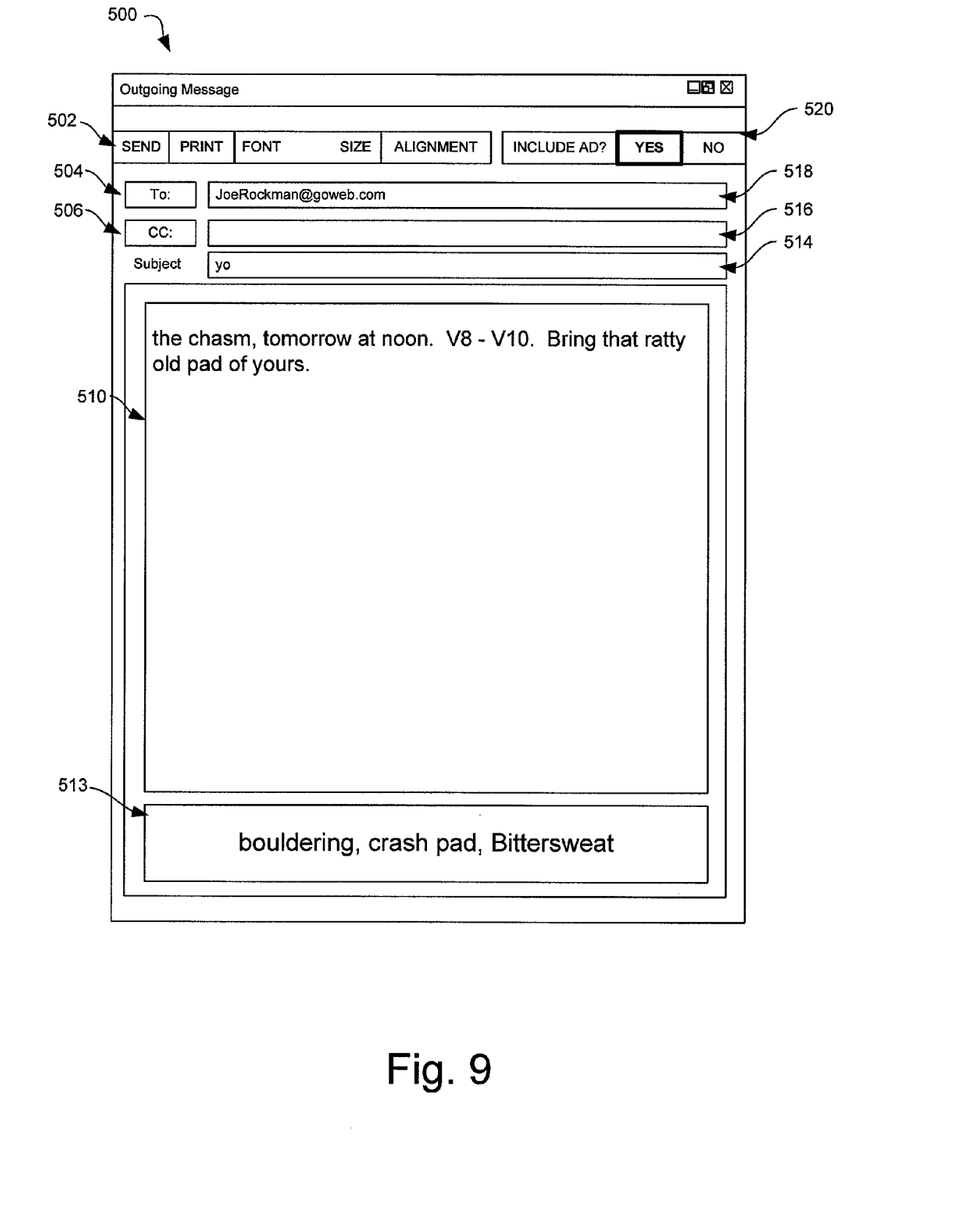
FIG. 9 illustrates an embodiment of the sender's user interface.

FIG. 9 illustrates an embodiment of the sender's user interface. This illustration shows an embodiment of the interface when the sender enters a limited text message, and a keyword cannot be identified. For instance, the illustrated subject heading, "yo", is a slang term that an electronic message system may not be able to use to identify a keyword. Additionally, the text message does not contain common nouns, phrases, or other language that may be amenable to keyword identification. As such, a suggested description textbox 513 may appear, or may already be an integrated element in the interface 800. In either case, the sender will be prompted to enter a suggested description since a keyword could not be identified. The suggested description entered by the sender is "bouldering, crash pad, Bittersweat" where bouldering is a form of climbing, crash pad is a piece of equipment used during bouldering, and Bittersweat is a company that produces crash pads. The sender may have entered these words because he/she recognized that the recipient has recently been shopping for a new crash pad, and Bittersweat is a little-known crash pad maker that he believes the recipient may be interested in purchasing a crash pad from. From this keyword, the advertisement engine may return an advertisement dealing with climbing, bouldering, crash pads, other climbing equipment, Bittersweat products, and others. Alternatively, the engine may return an advertisement that contains all three of these words in the advertisement or some combination of the three words.

Alternatively, the advertisement engine may return a listing of advertisements to the electronic message system. The electronic message system may transmit the advertisement listing to the sender, and the listing may be displayed on the user interface as illustrated in FIG. 10.

Figure 10:
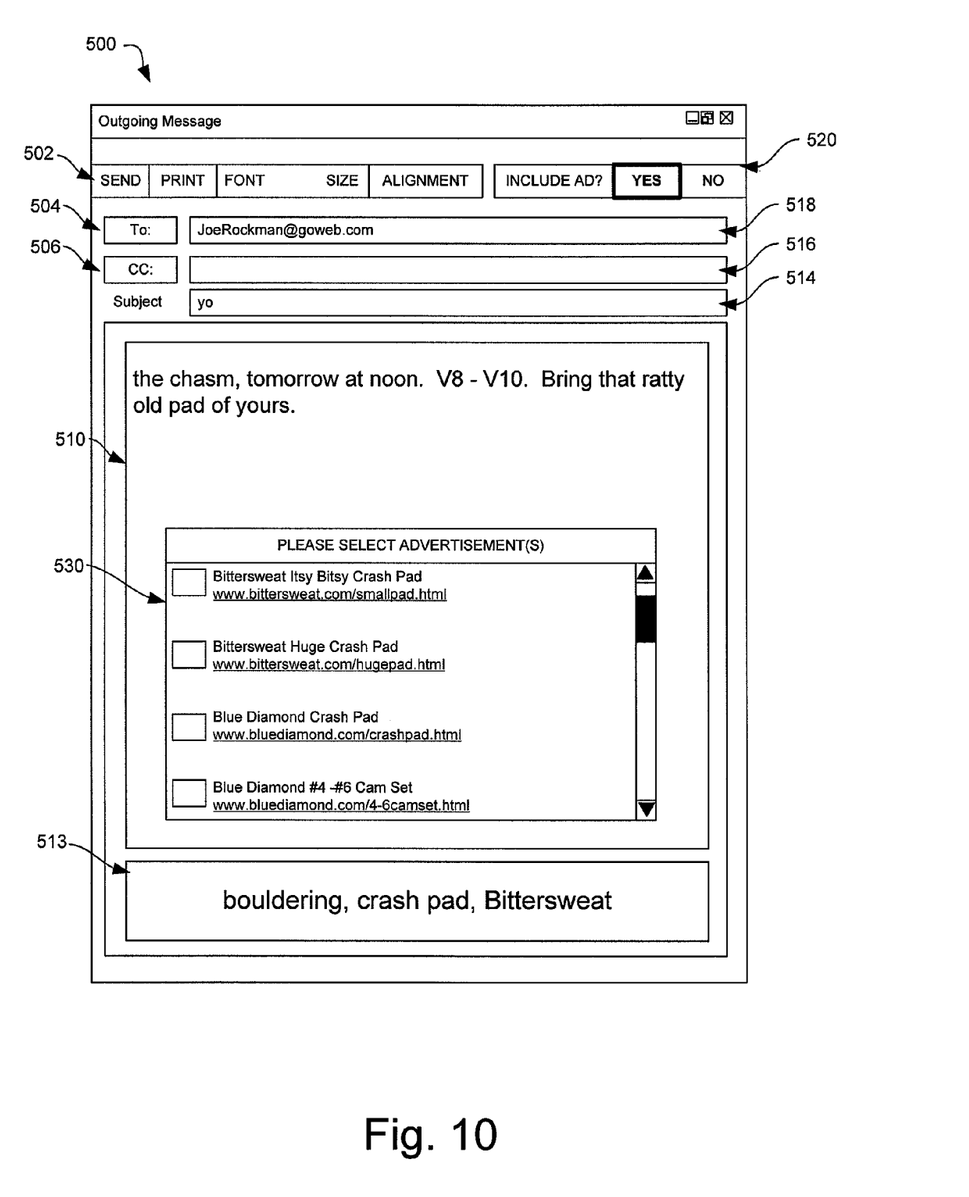
FIG. 10 illustrates an embodiment of the sender's user interface in which an advertisement listing is displayed.

FIG. 10 illustrates an embodiment of the sender's user interface in which an advertisement listing is displayed. The advertisement listing 530 may be displayed when a keyword cannot be identified. In this embodiment, the advertisement listing is displayed in response to the suggested description entered by the sender. In this manner, the advertisement engine does not automatically select an advertisement based on the suggested description, but rather provides a listing from which the sender may select an advertisement.

The advertisement listing 530 may include a plurality of advertisements as illustrated. The advertisement listing 530 may include a scroll bar to allow the sender to scroll through a large list of advertisements. Each advertisement may also include a selection object, such as the checkboxes illustrated, of which one or more may be selected in order to indicate to the advertisement engine which advertisements the sender wishes to be included in the electronic message.

Those skilled in the art will recognize that the methods, systems, and user interfaces of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For instance, the electronic message system and the advertisement engine may utilize multiple forms of generating advertisements. A keyword may be selected from the text message, an advertisement generated from the keyword, and the generated advertisement displayed for the sender's review. If the sender does not approve of the selected advertisement, he may indicate this via a reject-advertisement selection object, and in response then the advertisement engine may select a keyword from information about the sender, and from this keyword generate an advertisement. This advertisement may be displayed for the user's review, and if again this advertisement is not desired, then the sender may be prompted to select an advertisement from an advertisement listing. This is just one embodiment in which multiple methods for advertisement generation are combined.

Numerous other changes may be made that will readily suggest themselves to those skilled in the art and which are encompassed in the spirit of the invention disclosed and as defined in the appended claims.

What is claimed is:

1. A method comprising:
   transmitting, by a computing device, a graphical user interface including a message text input area configured to receive the body of a text message and a suggested description text box configured to receive a suggested description from a sender, wherein the graphical user interface does not initially display the suggested description text box;
   receiving, by the computing device from the sender over a network, a selection of one or more recipients from a plurality of recipients in a contact list of the sender, the selection indicating a decision by the sender to include advertisements in outgoing text messages to the one or more selected recipients;
   receiving, by the computing device, a transmission request from the sender, the transmission request identifying the text message and one or more selected recipients of the text message;
   determining, by the computing device, whether the text message includes a keyword based on the number of times the keyword appears within the text message or the location of the keyword in the text message;
   transmitting, by the computing device to the sender, an instruction to display the suggested description text box upon determining that the text message does not include a keyword, the instruction causing the graphical user interface to display the suggested description text box;
   receiving, by the computing device and from the sender, the suggested description associated with the recipient, the suggested description including one or more keywords entered by the sender into the suggested description text box;
   selecting, by the computing device, one or more keywords of the text message using the suggested description;
   determining, by the computing device, a selection of an advertisement;
   generating, by the computing device, the advertisement using the one or more keywords;
   automatically generating, by the computing device, an electronic message containing the text message and the determined advertisement;
   transmitting, by the computing device, the electronic message to the at least one of the selected recipients; and
   receiving, by the computing device, a notification that the at least one of the selected recipients selected the advertisement.

2. The method of claim 1 further comprising:
   storing, in a profile associated with the sender, information indicating that the permission was received; and
   in response to receiving the transmission request, verifying that the permission has been received from the sender.

3. The method of claim 1 further comprising:
   generating the advertisement using at least one user profile.

4. The method of claim 1 further comprising:
   selecting the one or more keywords from the text message.

5. The method of claim 1 further comprising:
accessing a first set of information regarding the sender; and
selecting the one or more keywords from the first set of information.

6. The method of claim 1 further comprising:
accessing a second set of information regarding the recipient; and
selecting the one or more keywords from the second set of information.

7. The method of claim 1 further comprising:
displaying a listing of advertisements to the sender; and
receiving, from the sender, a selection of the advertisement for inclusion in the electronic message.

8. The method of claim 1 further comprising:
receiving a payment from an advertiser associated with the advertisement; and
paying the sender an amount based on the payment received from the advertiser.

9. A method comprising:
transmitting, by a computing device, a graphical user interface including a message text input configured to receive the body of a text message and a suggested description text box configured to receive a suggested description from a sender, wherein the graphical user interface does not initially display the suggested description text box;
receiving, by the computing device from the sender over a network, a selection of one or more recipients from a plurality of recipients in a contact list of the sender, the selection indicating a decision by the sender to include advertisements in outgoing text messages to the one or more selected recipients;
receiving, by the computing device, a transmission request from the sender, the transmission request identifying the text message and one or more selected recipients of the text message;
determining, by the computing device, whether the text message includes a keyword based on the number of times the keyword appears within the text message or the location of the keyword in the text message;
transmitting, by the computing device to the sender, an instruction to display the suggested description text box upon determining that the text message does not include a keyword, the instruction causing the graphical user interface to display the suggested description text box;
receiving, by the computing device and from the sender, the suggested description associated with the recipient, the suggested description including one or more keywords entered by the sender into the suggested description text box;
selecting, by the computing device, one or more keywords of the text message using the suggested description;
determining, by the computing device, a selection of an advertisement;
generating, by the computing device, the advertisement using the one or more keywords;
automatically generating, by the computing device, an electronic message containing the text message and the determined advertisement; and
transmitting, by the computing device, the electronic message to the at least one of the selected recipients.

10. The method of claim 9 further comprising:
storing, in a profile associated with the sender, information indicating that the permission was received; and
in response to receiving the transmission request, verifying that the permission has been received from the sender.

11. The method of claim 9 further comprising:
receiving a notification that a recipient selected the advertisement;
billing an advertiser associated with the advertisement a first amount; and
rewarding the sender with a second amount based on the first amount.

12. The method of claim 9 further comprising:
displaying a listing of advertisements to the sender; and
receiving, from the sender, a selection of the advertisement for inclusion in the electronic message.

13. The method of claim 11 further comprising:
receiving a notification that a recipient selected the advertisement;
billing an advertiser associated with the advertisement a first amount; and
rewarding the sender with a third amount based on the first amount.

14. A system comprising:
a client device connected to a network, wherein the client device is configured to receive and display a graphical user interface received over the network; and
an electronic message system connected to the network and comprising a processor, wherein the electronic message system is configured to:
transmit the graphical user interface to the client device, the graphical user interface including a message text input configured to receive the body of a text message and a suggested description text box configured to receive a suggested description from a sender, wherein the graphical user interface does not initially display the suggested description text box,
receive a selection from a sender over a network of one or more recipients from a plurality of recipients in a contact list of the sender, the selection indicating a decision by the sender to include advertisements in outgoing text messages to the one or more recipients,
receive a transmission request from the sender, the transmission request identifying a text message and one or more selected recipients of the text message,
determine whether the text message includes a keyword based on the number of times the keyword appears within the text message or the location of the keyword in the text message,
transmit, to the sender, an instruction to display the suggested description text box upon determining that the text message does not include a keyword, the instruction causing the graphical user interface to display the suggested description text box,
receive, from the sender, the suggested description associated with at least one of the selected recipients, the suggested description including one or more keywords entered by the sender into the suggested description text box,
select one or more keywords of the text message using the suggested description, for determining a selection of an advertisement, and
automatically generate an electronic message containing the text message and the determined advertisement.

15. The system of claim 14 further comprising:
an advertisement engine for selecting advertisements based on the one or more keywords.

16. The system of claim 15 wherein the system communicates with the sender and the at least one of the selected recipients via a network.

17. The system of claim 16 wherein the network is an Internet.

18. The system of claim 16 wherein the electronic message system communicates with the advertisement engine via the network.

* * * * *